United States Patent [19]
van der Hoek et al.

[11] 4,381,140
[45] Apr. 26, 1983

[54] OPTICAL FIBER CABLE

[75] Inventors: Willem van der Hoek; Hermanus N. Tuin, both of Eindhoven, Netherlands

[73] Assignee: U.S. Philips Corporation, New York, N.Y.

[21] Appl. No.: 188,195

[22] Filed: Sep. 18, 1980

[30] Foreign Application Priority Data

Oct. 8, 1979 [NL] Netherlands .................. 7907433

[51] Int. Cl.³ .................................. G02B 5/14
[52] U.S. Cl. .......................... 350/96.23; 250/227
[58] Field of Search ............... 350/96.1, 96.15, 96.16, 350/96.23, 96.24; 250/227

[56] References Cited

U.S. PATENT DOCUMENTS 4,118,594 10/1978 Arnaud ........................ 350/96.23
4,227,770 10/1980 Gunn .......................... 350/96.23

FOREIGN PATENT DOCUMENTS 52-35651 3/1977 Japan ......................... 350/96.23
1470890 3/1977 United Kingdom ............. 350/96.23

OTHER PUBLICATIONS

"Principles of Fibre-Optical Cable Design," Foord et al., Proc. IEEE, vol. 123, No. 6, Jun. 1976, pp. 597–602.
"Unit Core Cable Structure for Optical Communication Systems," Swiecicki et al., Proc. of the 27th International Wire and Cable Symposium, Nov. 14, 15, 16, 1978, pp. 404–410.

*Primary Examiner*—Marvin L. Nussbaum
*Attorney, Agent, or Firm*—Marc D. Schechter

[57] ABSTRACT

An optical fiber cable comprising a cylindrical body and optical fibers which are located, and periodically fixed, in respective grooves in the body. The grooves extend along the length of the body in a helical manner, which may periodically change its sense of rotation. The grooves are either in the surface of the body or in the inner surface of a jacket surrounding the body. The fibers may be fixed after every full turn by means of a wire located in a longitudinal groove which crosses the grooves in which the fibers are fixed. The fibers may alternatively be periodically fixed by means of a longitudinally extending adhesive strip. The whole assembly may be provided with a layer of wound tape and a jacket.

11 Claims, 7 Drawing Figures

OPTICAL FIBER CABLE

BACKGROUND OF THE INVENTION

The invention relates to an optical fiber cable of the kind in which the optical fibers are located in grooves which extend helically either in the outer surface of a cylindrical body which extends along the length of the cable or in the inner surface of a jacket directly surrounding a cylindrical body. The grooves may wind in one direction or they may periodically change direction. The optical fibers are disposed in the grooves with such an excess length that elongation of the cable, which may occur, for example, during laying of the cable or by thermal expansion, can be compensated for.

Cables in which the grooves are arranged in the outer surface of a central cylindrical body are known, generally. A further element which is, for example, provided in the center of the cylindrical body may be present for the purpose of absorbing tensile loads. One or more metal wires or synthetic resin material wires (for example Kevlar) or glass fibers may, for example, be used for this purpose. The cylindrical body may also be a synthetic resin material.

The grooves in the cylindrical body may extend helically along the full length of the cable into one direction only, or they may repeatedly change their direction after one or more turns or part thereof.

The grooves may have any cross-sectional shape, for example a rectangular shape. However, there must be sufficient room in the grooves that each fiber can take a position in a groove without being mechanically loaded in a manner which detrimentally affects the optical quality of the fiber. This means that there must be sufficient room to offset positive or negative changes in the ratio between the length of the cable and the length of the fibers. One or more layers of a synthetic resin material may be applied around the cylindrical elongate body, for example in the form of wound tapes and one or more jackets and reinforcing elements, wire armourings etc., as is customary in the cable industry to protect the cables from moisture and mechanical stress. The grooves may be filled along their full length with a material which guarantees that they will be water tight along the entire length of the cable. For example, the grooves may be filled with a paraffin jelly, silicone oil or silicone grease.

With a cable of this nature there is the risk that due to vibration of a portion of the cable, for example due to traffic, or due to the orientation of a portion of the cable, for example due to a vertical or sloping orientation, the fibers may move along the length of the cable and the originally uniformly distributed excess length assembles in one or more places, for example the lowest place(s). This is disadvantageous, because changes in the length of the cable, for example as a result of an increase in temperature, may result in a mechanical loading of the optical fibers in those places where there is no longer any excess length. Mechanical loading may also occurs when the temperature falls in those places in the cable where there is no longer any excess room in the groove to take up the excess length.

SUMMARY OF THE INVENTION

It is an object of the invention to prevent the fibers from moving along the length of the cable, so that the excess length of the optical fiber remains uniformly distributed along the full cable length, irrespective of the orientation of the cable. This object is accomplished by periodically fixing the fiber in the groove of the cable.

Optical fibers can be fixed in the grooves in different manners. It is advantageous to fix the fiber after each full turn. The fiber portion located between the points where the fiber is fixed can move freely in the grooves. Elongation or shrinking of the cable causes the free portion of the fiber to move in the groove towards the axis of the centrally located body or in a direction away from the axis, respectively, without subjecting the fiber to a mechanical load which might be detrimental to its optical properties. It is, however, no longer possible for the excess length to accumulate in one or more places because of vibration or because the cable is not located horizontally. Instead, the excess length of the optical fibers remains uniformly distributed along the full cable length.

There now follows a description of those embodiments of the invention in which the grooves have been disposed in the outer circumference of a centrally located cylindrical body. The optical fibers can be fixed to the cylindrical body in, for example, the following manner:

In a first embodiment, the cylindrical body is provided with an extra groove which is preferably of the same depth as the grooves which are intended to accommodate the optical fibers. The extra groove may extend helically or it may not, but it must cross the grooves intended for the optical fibers. A wire which is connected to the optical fibers at the crossing points is placed in the extra groove. In a suitable embodiment the wire is injection-molded in situ from a thermoplastic synthetic resin material, which is connected in situ to the optical fibers at the crossing points.

It is alternatively possible to fill the extra groove, after the optical fibers are located in their respective grooves with a synthetic resin compound, for example a foamed synthetic resin material such as polyurethane. The last-mentioned embodiment has the advantage that, should the cable develop a leak, water cannot pass through the cable via the grooves which accommodate the optical fibers. Both measures can, of course, be combined.

In a second embodiment, a compound which blocks the movement of the fibers can be disposed at regularly spaced positions in the helical grooves which accommodate the optical fibers. The compound may consist of a thermoplastic synthetic resin material, for example in the foamed form such as polyurethane resin. The points where the fibers are fixed may be on a line which extends parallel to the axis of the grooved central body. It is alternatively possible to provide ring-shaped fixing points at regular distances, so that all the parallel grooves with fibers are given a fixing point at each location. The compound can be applied in situ into the grooves. It is alternatively possible to dispose on the outer circumference a strip of foamable material, which starts foaming in response to the transfer of heat, for example when the jacket is applied, thus filling the grooves at the strip-groove crossing points. In this embodiment, the migration of water through the grooves which accommodate the optical fibers is also adequately prevented.

In a third embodiment of the invention, after the optical fibers have been positioned in grooves of the cylindrical body, an adhesive strip is disposed on the circumference of the body. The adhesive side of the strip faces the bottom of the grooves. The adhesive strip may extend predominantly parallel to the axis of the cylindrical body. It is, however, alternatively possible to provide the adhesive strip in other manners, provided the adhesive strip crosses the grooves in which the optical fibers have been located. For example, the adhesive strip may be arranged annularly or helically.

Due to the presence of the adhesive strip which is connected to the fibers at regular distances (in the case of helical grooves, for example, the fibers are connected after each full turn of 360°), the fiber is prevented from moving along the cable axis, which otherwise might result in an accumulation of optical fibers in certain places.

In this cable construction it is also possible for the fibers, by changing their position in the groove, to neutralize unavoidable changes in the ratio of cable length-to-fiber(s) length in a positive sense (mechanical elongation, thermal expansion) and negative sense (shrinkage), without the fibers being excessively mechanically loaded.

The adhesive strip may, for example, consist of a saturated polyester synthetic resin material strip which is coated on one side with a preferably permanently sticky material. The sticky material may be, for example, a mixture of a natural or a synthetic rubber and a natural resin. The resin may be, for example, a rosin derivative.

DESCRIPTION OF THE PREFERRED EMBODIMENTS

Figure 1:
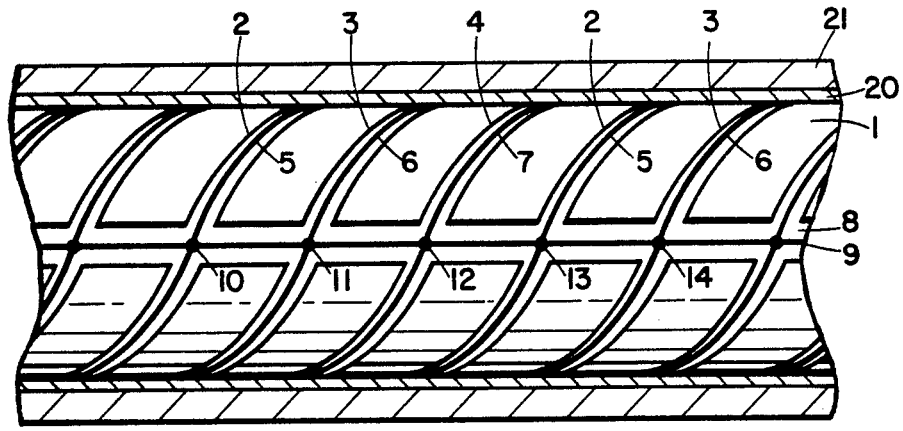
FIGS. 1–5 are side-elevational views, cross-sections, of cable portions according to the invention.

The cable portion shown in a side-elevational, partly cross-sectional view in FIG. 1 comprises a cylindrical elongate body 1 of a predominantly circular cross-section. A number of grooves 2, 3 and 4, which accommodate optical fibers 5, 6 and 7 are located around the circumference of the body 1. A groove 8, which accommodates a wire 9, is provided at the circumference of the body 1 parallel to the axis of the cylindrical body 1.

At the cross-over points, indicated as 10 to 14, inclusive, the wire 9 is connected to the appropriate optical fibers 5, 6 and 7 (each twice connected) in the respective grooves 2, 3 and 4. The Figure shows that the optical fibers are fixed by the wire after each full turn. In this construction it is possible for the optical fibers to move within the grooves, in the case of elongation or shrinkage of the cable in its longitudinal direction, without excessively loading the fibers. Also, the wire 9 is still movable in the groove 8.

The connection to the optical fibers at the cross-over points 10 to 14 can be realized by means of an adhesive for example, a synthetic resin. The wire 9 and also the optical fibers 5, 6 and 7 in grooves 2, 3 and 4 may consist of glass. It is, however, alternatively possible to accommodate a wire 9 of synthetic resin material in the groove 8 and to make the connections at the cross-points 10 to 14 by heating the wire 9 at the cross-over points until the wire becomes sticky and sticks to the optical fibers 5, 6 and 7 in grooves 2–4.

Figure 2:
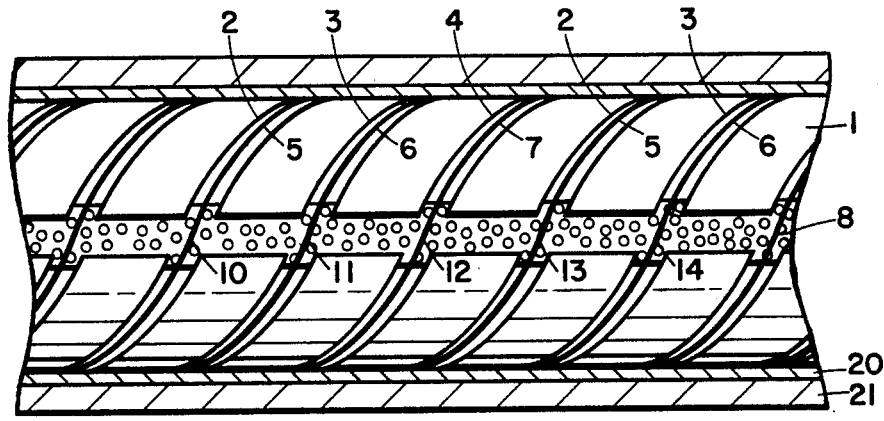

The construction shown in FIG. 2 shows an alternative manner of fixing the optical fibers 5 to 7. To this end groove 8 is filled, after the optical fibers have been accommodated in grooves 2, 3 and 4, with synthetic resin material for example in the form of a foam, such as polyurethane foam. This furnishes the additional advantage that when the cable develops a leak, migration of penetrating water along the length of the cable through the grooves 2, 3 and 4 is prevented.

Figure 3:
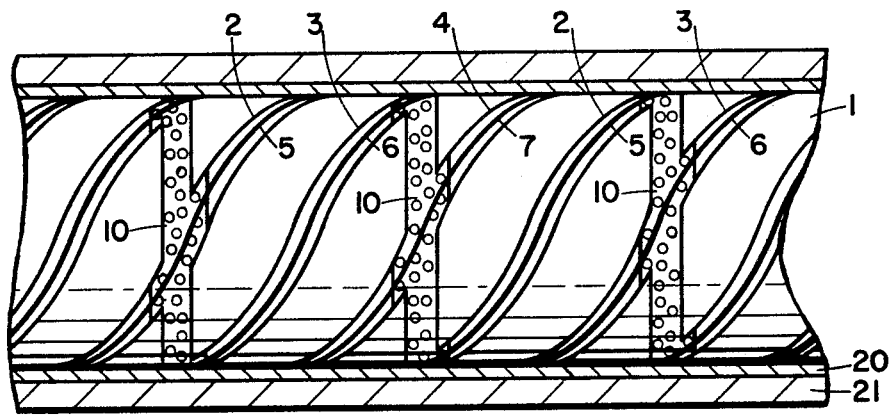

FIG. 3 shows a similar construction. Herein annular grooves 10 have been provided at regular distances in the cylindrical elongate body 1. Similar to the construction shown in FIG. 2, the annular grooves have been filled with a synthetic resin material after the optical fibres 5, 6 and 7 have been accommodated in the grooves 2, 3 and 4.

Figure 4:
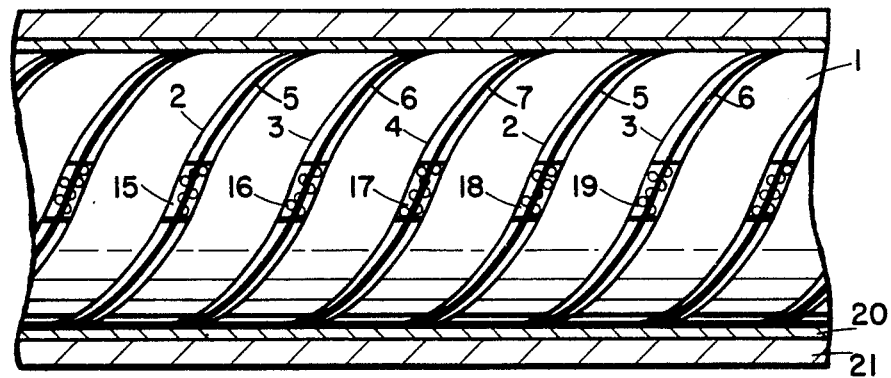

FIG. 4 shows an alternative manner of fixing the optical fiber 5, 6 and 7 in the grooves 2, 3 and 4. A small quantity, which is, however, sufficient to fix the fibers, of a synthetic resin compound is injected into the respective groove parts (15 to 19 inclusive). For example, a compound which foams after application may be injected in the groove parts.

In the Figures, the reference numerals have the same meaning. Thus, reference numeral 20 denotes a first synthetic resin material layer, for example in the form of a synthetic resin tape winding. The assembly may be surrounded by an extruded synthetic resin jacket 21, for example consisting of polyethylene.

Figure 5:
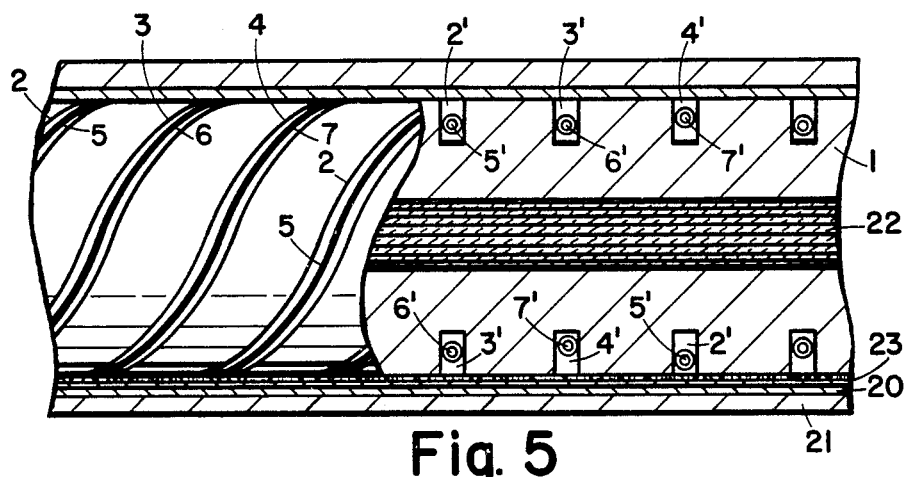

The cable shown in FIG. 5 comprises a cylindrical elongate body 1 having a circular cross-section. The outer circumference of the body 1 has been provided with helical grooves. Reference numerals 2, 3 and 4 show a plan view of these grooves, which are also shown in cross-section at 2' and 3'. An element 22, which extends along the full length of the cable and which absorbs any tensile load, is in a central position in the cylindrical body. This element 22 may, for example, consist of twisted metal wires or of fibers consisting either of synthetic resin or glass. The cylindrical body 1 may, for example, consist of polyethylene.

Optical fibers 5, 6 and 7 have been accommodated in the grooves 2, 3 and 4. The fibers 5, 6 and 7 are disposed with a sufficient excess of length in the grooves 2, 3 and 4 so that changes in the length of the cable can be offset by movement of the optical fibers toward or away from the axis of the cable without exerting an excessive mechanical load on the optical fibers.

An adhesive strip 23 has been disposed along the length of the cable, parallel to the axis thereof, with the adhesive side facing inward. Adhesive strip 23 fixes the positions of the optical fibers 5, 6 and 7 in the grooves. This prevents the excess lengths of the optical fibers from migrating to certain places in the cable.

The whole assembly may be provided with still further layers, two of which are shown in FIG. 5. For example a layer of wound tape 20, consisting of polyethylene terephthalate, and a jacket 21, consisting of for example polyethylene, may be provided.

The cable according to the invention is manufactured in the customary manner. The cylindrical body 1 is obtained by means of extrusion. Subsequent to the time when the optical fibers 5, 6 and 7 are accommodated in the grooves 2, 3 and 4 and prior to the provision of the layer of wound tape 20, the adhesive strip 23 is disposed on the continuously moving cylindrical body 1.

Figure 6:
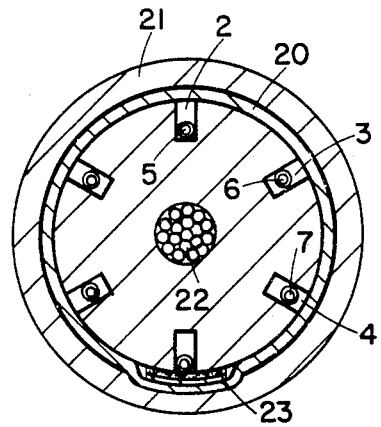
FIG. 6 is a cross-sectional view through the axis of the cable according to the invention.

FIG. 6 shows a cross-sectional view of the finished cable having six grooves and a corresponding number of optical fibers. The reference numerals have the same meanings as in FIG. 5. FIG. 6 shows the two layers of the adhesive strip 23. The layer which contacts the cylindrical body 1 is preferably permanently adhesive, so that a certain angular rotation of the optical fiber is possible without generating a mechanical load or microbending which might cause fracture or degrade the optical quality of the fibers.

FIGS. 5 and 6 are an embodiment of the invention in which the adhesive strip has been provided along the length of the cable, parallel to the axis of the cylindrical body 1. It is alternatively possible to provide the adhesive strip 23 in the form of rings around the cylindrical body 1 or as a helix which crosses the grooves 2, 3 and 4.

In the foregoing description where mention is made of a helically extending groove on the circumference of the cylindrical body 1, it is understood that this reference not only means a helix which has the same direction of rotation along the full length of the cylindrical body, but also a helix which periodically changes its direction, for example after each full turn.

In the foregoing description, embodiments have been particularly described in which the grooves have been provided in the outer circumference of a central cylindrical body. It will be obvious that fibers which are accommodated in grooves in the inner circumference of a jacket can be fixed in a similar manner.

Figure 7:
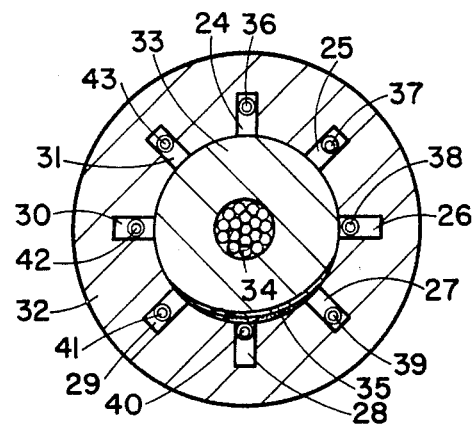
FIG. 7 is a cross-sectional view through the axis of another cable according to the invention.

FIG. 7 shows an example of grooves in the inner circumference of a jacket. This Figure shows a cross-sectional view of a cable in which grooves 24 to 31 are pressed in a synthetic resin material jacket 32. The jacket 32 has been provided by extrusion around a cylindrical core 33, which extends along the full cable length. An armouring 34, for example of metal wires, has been provided inside the core 33. The core 33 has been provided with an adhesive strip 35, which extends along the length of the cable. The adhesive layer of strip 35 faces outward.

Optical fibers 36–43 are accommodated in the helical grooves 24–31 which extend along the length of the cable. In FIG. 7, fiber 40 is connected to the adhesive strip 35 and is fixed there by this strip. It will be obvious that in this manner all fibers are fixed after a full turn.

What is claimed is:

1. An optical fiber cable comprising:
   a longitudinally extending cylindrical body having an outer surface with a helical groove therein;
   an optical fiber in the helical groove; and
   means for fixing the fiber in the groove at periodically spaced locations, said means preventing the fiber from moving in the groove along the length of the cable.

2. An optical fiber cable as claimed in claim 1, characterized in that the means for fixing the fiber in the groove comprises a wire, accommodated in a second groove in the outer surface of the cylindrical body, said second groove extending along the length of the cylindrical body and periodically crossing the groove which contains the optical fiber, the optical fiber being connected to the wire at each crossing.

3. An optical fiber cable as claimed in claim 1, characterized in that the means for fixing the fiber in the groove comprises a synthetic resin compound, provided in a second groove in the outer surface of the cylindrical body, said second groove crossing the groove which contains the optical fiber, the optical fiber being connected to the resin at the crossing.

4. An optical fiber cable as claimed in claim 3, characterized in that the second groove extends along the length of the cylindrical body and periodically crosses the groove which contains the optical fiber, the optical fiber being connected to the resin at each crossing.

5. An optical fiber cable as claimed in claim 3, characterized in that the second groove encircles the cylindrical body.

6. An optical fiber cable as claimed in claim 3, characterized in that the resin compound is a foam.

7. An optical fiber cable comprising:
   a longitudinally extending cylindrical body;
   a jacket surrounding the cylindrical body, said jacket having an inner surface with a helical groove therein;
   an optical fiber in the helical groove; and
   means for fixing the fiber in the groove at periodically spaced locations, said means preventing the fiber from moving in the groove along the length of the cable.

8. An optical fiber cable as claimed in claim 1, or 7, characterized in that the fiber is fixed after each turn around the cylindrical body.

9. An optical fiber cable as claimed in claim 1 or 7, characterized in that the means for fixing the fiber comprises an adhesive strip.

10. An optical fiber cable as claimed in claim 9, characterized in that the adhesive strip extends along the length of the cable, and it has an adhesive layer facing the fiber and the groove.

11. An optical fiber cable as claimed in claim 7, characterized in that the means for fixing the fiber in the groove comprises a wire, accommodated in a second groove in the jacket, said second groove extending along the length of the jacket and periodically crossing the groove which contains the optical fiber, the optical fiber being connected to the wire at each crossing.

* * * * *